(12) United States Patent
Peng et al.

(10) Patent No.: US 6,744,599 B1
(45) Date of Patent: Jun. 1, 2004

(54) AIR BEARING SLIDER WITH AN ANGULARLY DISPOSED CHANNEL FORMED BETWEEN A SIDE RAIL AND A LEADING SIDE AIR BEARING SURFACE

(75) Inventors: Jih-Ping Peng, Cupertino, CA (US); Shashi B. Agarwal, Santa Clara, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 221 days.

(21) Appl. No.: 10/137,477

(22) Filed: Apr. 30, 2002

(51) Int. Cl.[7] .................................................. G11B 5/60
(52) U.S. Cl. ............................. 360/236.2; 360/236.1; 360/236.3
(58) Field of Search ..................... 360/236.1, 236.2, 360/236.3, 236.8, 236.9, 237

(56) References Cited

U.S. PATENT DOCUMENTS

| | | | | |
|---|---|---|---|---|
| 4,553,184 A | * | 11/1985 | Ogishima ................. | 360/235.8 |
| 5,062,017 A | * | 10/1991 | Strom et al. .............. | 360/236.1 |
| 5,086,360 A | * | 2/1992 | Smith et al. .............. | 360/236.6 |
| 5,097,370 A | * | 3/1992 | Hsia ........................ | 360/236.1 |
| 5,309,303 A | * | 5/1994 | Hsia et al. ................ | 360/236.1 |
| 5,777,825 A | | 7/1998 | Dorius | |
| 5,822,153 A | * | 10/1998 | Lairson et al. ........... | 360/234.7 |
| 5,870,250 A | | 2/1999 | Bolasna et al. | |
| 5,973,881 A | * | 10/1999 | Ajiki ....................... | 360/235.8 |
| 6,072,662 A | * | 6/2000 | Utsunomiya ............. | 360/236.1 |
| 6,115,219 A | * | 9/2000 | Hall ......................... | 360/234.2 |
| 6,172,851 B1 | * | 1/2001 | Utsunomiya ............. | 360/236.3 |
| 6,411,468 B1 | * | 6/2002 | Park et al. ................ | 360/236.3 |
| 6,590,746 B2 | * | 7/2003 | Kang et al. .............. | 360/236.3 |
| 6,661,612 B1 | * | 12/2003 | Peng ....................... | 360/236.3 |
| 2002/0008940 A1 | * | 1/2002 | Jang et al. ............... | 360/236.3 |
| 2002/0131209 A1 | * | 9/2002 | Anaya-Dufresne et al. | 360/236.2 |
| 2003/0039073 A1 | * | 2/2003 | Rao ......................... | 360/235.8 |

* cited by examiner

*Primary Examiner*—Brian E. Miller
(74) *Attorney, Agent, or Firm*—Won Tae C. Kim, Esq.; Milad G. Shara, Esq.; Stetina Brunda Garred & Brucker

(57) ABSTRACT

An air bearing slider for use in a disk drive. The slider includes a leading side and an opposing trailing side. The slider includes a pair of opposing lateral sides disposed between the leading and trailing sides. The slider includes a leading side air bearing surface including a main portion adjacent the leading side and a trailing portion extending from the main portion toward the trailing side along a respective one of the lateral sides. The slider includes a side rail disposed laterally along and between the respective lateral side and the trailing portion. The slider includes a channel formed between the side rail and the trailing portion disposed angularly with respect to the respective lateral side by extending from adjacent the respective lateral side towards the trailing side away from the respective lateral side for receiving airflow through the channel during operation of the disk drive.

57 Claims, 5 Drawing Sheets

AIR BEARING SLIDER WITH AN ANGULARLY DISPOSED CHANNEL FORMED BETWEEN A SIDE RAIL AND A LEADING SIDE AIR BEARING SURFACE

CROSS-REFERENCE TO RELATED APPLICATIONS

Not applicable.

BACKGROUND OF THE INVENTION

1. Field of the Invention

The present invention relates generally to disk drives, and in particular to an air bearing slider which includes an angularly disposed channel formed between a side rail and a leading side air bearing surface.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA).

The spindle motor includes a spindle motor hub that is rotatably attached to the disk drive base. The spindle motor hub has an outer hub flange that supports a lowermost one of the disks. Additional disks may be stacked and separated with annular disk spacers that are disposed about the spindle motor hub. The head stack assembly has an actuator assembly including at least one air bearing slider or head, typically several, for reading and writing data from and to the disk. Each air bearing slider includes a magnetic transducer. An example of a slider is disclosed in U.S. Pat. No. 5,777,825 (incorporated herein by reference) that describes a slider where a center pad disposed at a trailing side contains a transducer. The printed circuit board assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The head stack assembly includes the actuator assembly, at least one head gimbal assembly (HGA), and a flex circuit cable assembly that are attached to the actuator assembly. A conventional "rotary" or "swing-type" actuator assembly typically comprises an actuator body, a pivot bearing cartridge, a coil portion that extends from one side of the actuator body to interact with one or more permanent magnets to form a voice coil motor, and one or more actuator arms that extend from an opposite side of the actuator body. The actuator body includes a bore and the pivot bearing cartridge engaged within the bore for allowing the actuator body to rotate between limited positions. At least one head gimbal assembly is distally attached to each of the actuator arms. A head gimbal assembly includes an air bearing slider that is attached to a suspension with a gimbal. The suspension resiliently supports the slider above the tracks of the disk during operation of the disk drive facilitating the slider to "fly" above the disk. The head gimbal assemblies and the flex circuit cable assembly are attached to the actuator assembly. The actuator assembly is controllably rotated so as to move the sliders relative to the disks for reading and writing operations with respect to the tracks contained on the disks.

A typical slider design includes leading and trailing sides. A center pad that includes an air bearing surface is disposed adjacent the trailing edge. A transducer is embedded within the center pad. At least one additional air bearing surface disposed upon a pad is provided adjacent the leading side. In this regard, a single air bearing surface may be provided which extends the width of the slider. Alternatively, a pair of air bearing surfaces may be provided at opposite lateral sides of the slider adjacent the leading edge. In addition, a depressed region or cavity is centrally disposed between the center pad and the leading side air bearing surfaces. Furthermore, lateral pad or side rails may be disposed laterally with respect to the slider for providing aerodynamic stability, especially with respect to roll stability.

In order to increase the amount of data recorded upon a given disk, specifications for increasing areal density continue to increase. As a result, it is desirable to fly the slider at lower and lower heights above the tracks of the disks. However, lower fly heights increase the susceptibility of the slider coming into physical contact with the disk during operation. Such contact or "crash" may result in damage to the slider, including the transducer therein, as well as the disk and the data associated with the tracks.

The various tracks recorded on the disk form an annular data region across the disk. Non-data regions are typically disposed at the ID radius and OD radius of the disk. In one configuration, the head stack assembly is configured to pivot the actuator assembly such that the sliders are positioned or parked on a ramp overlying a portion of a non-data region, such as at the OD radius, when the disk drive is not performing disk reading or writing operations. In such a configuration, during loading and unloading operations, the sliders may be subject to a variety of forces that may result in the sliders coming into contact with the disk at the adjacent non-data region. Accordingly, there is a need in the art for an improved slider in comparison to the prior art.

SUMMARY OF THE INVENTION

An aspect of the present invention can be regarded as the air bearing slider for use in a disk drive. The slider includes a leading side and an opposing trailing side. The slider further includes a pair of opposing lateral sides disposed between the leading and trailing sides. The slider further includes a leading side air bearing surface. The leading side air bearing surface includes a main portion adjacent the leading side and a trailing portion extending from the main portion toward the trailing side along a respective one of the lateral sides. The slider further includes a side rail disposed laterally along and between the respective lateral side and the trailing portion. The slider further includes a channel formed between the side rail and the trailing portion disposed angularly with respect to the respective lateral side by extending from adjacent the respective lateral side towards the trailing side away from the respective lateral side for receiving airflow through the channel during operation of the disk drive.

According to various embodiments, the side rail may be tapered towards the leading side. The trailing portion may be tapered towards the trailing side. The side rail may include a side rail air bearing surface disposed toward the trailing side, and a side rail shallow recessed surface extending away from the side rail air bearing surface laterally along and between the respective lateral side and the trailing portion. The side rail shallow recessed surface may be tapered toward the leading side. The side rail air bearing surface may include a leading edge angularly disposed with respect to the opposing lateral sides. The leading edge of the side rail air bearing surface is disposed substantially perpendicular with respect to the channel. The slider may further include a deep recessed surface disposed between the leading and trailing sides. The deep recessed surface may extend into the channel. The channel may be disposed at an angle of between 10 to 20 degrees with respect to the respective lateral side. The slider may further include a trailing side pad including a transducer disposed adjacent the trailing side. The trailing side pad may include a trailing side air bearing surface disposed adjacent the trailing side. The trailing side pad may include a trailing side shallow recessed surface extending towards the leading side from the trailing side air bearing surface. The trailing side air bearing surface may include a leading edge angularly disposed with respect to the opposing lateral sides. The leading edge of the trailing side air bearing surface may be disposed substantially perpendicular with respect to the channel. The side rail may be a first side rail, and the slider may further include a second side rail disposed adjacent the other respective one of the opposing lateral sides. The trailing portion may be a first trailing portion, and the leading side air bearing surface may further include a second trailing portion extending from the main portion toward the trailing side along the other respective lateral side. The second trailing portion may be disposed laterally along and between the second side rail and the other respective lateral side. The channel may be a first channel, and the slider may further include a second channel formed between the second trailing portion and the second side rail disposed angularly with respect to the other respective lateral side by extending from adjacent the other respective lateral side towards the leading side away from the other respective lateral side for receiving airflow through the second channel during operation of the disk drive.

According to another aspect of the present invention, there is provided a disk drive including a disk drive housing and a head stack assembly rotatably coupled to the disk drive housing. The head stack assembly includes an air bearing slider in its various embodiments as discussed above.

DESCRIPTION OF THE PREFERRED EMBODIMENTS

Figure 1:
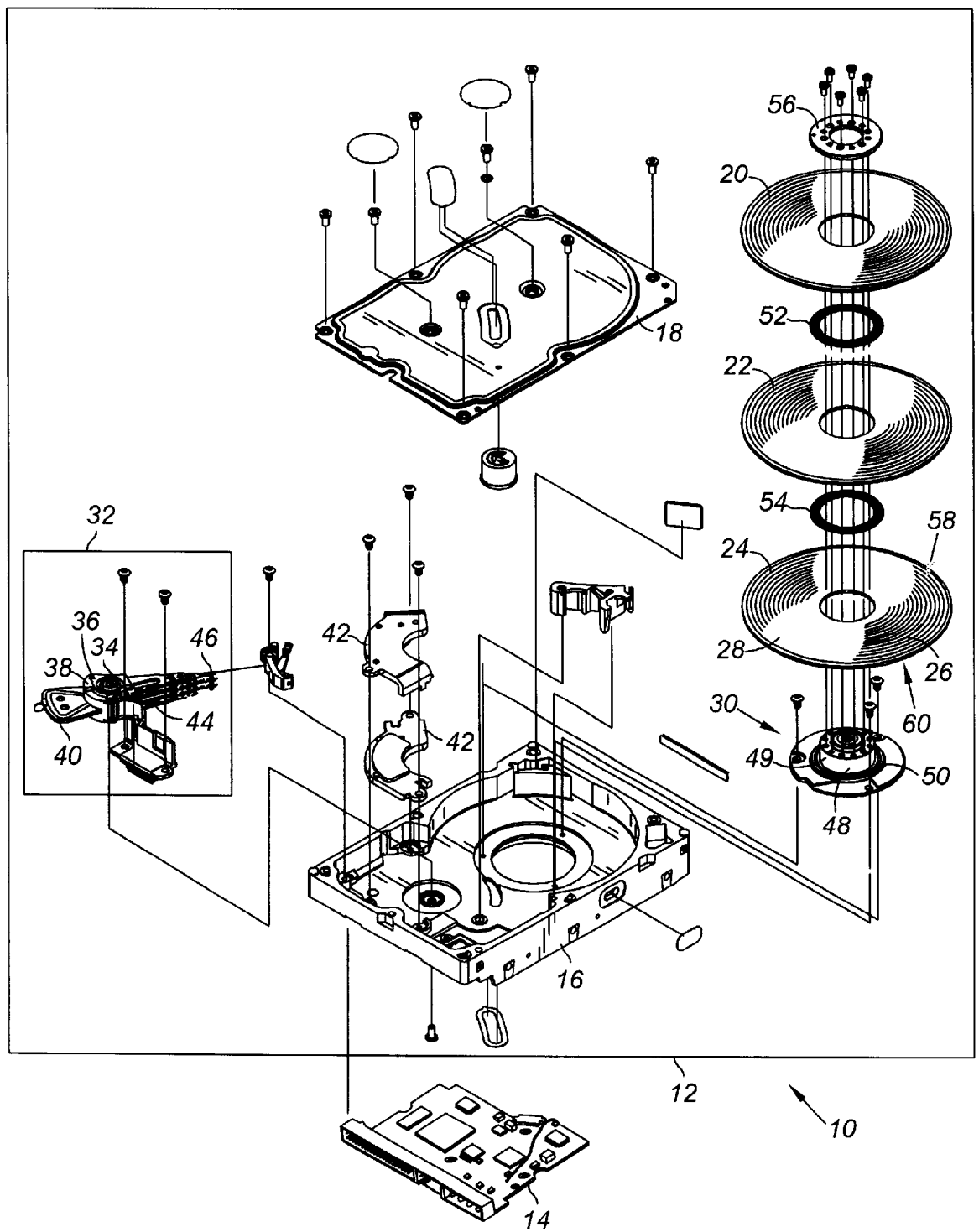
FIG. 1 is an exploded perspective view of a disk drive including air bearing sliders as constructed in accordance with the present invention.

Referring now to the drawings wherein the showings are for purposes of illustrating preferred embodiments of the present invention only, and not for purposes of limiting the same, FIGS. 1–8 illustrate a disk drive including an air bearing slider in accordance with the aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a housing which may include a disk drive base 16 and a cover 18 that collectively house magnetic disks 20, 22, 24. Each magnetic disk 20, 22, 24 contains a plurality of tracks for storing data. The magnetic disks 20, 22, 24 may be two-sided, and thus for example, the magnetic disk 24 is shown having a track 26 on an upper facing side 58 and a track 28 (shown in phantom) on a lower facing side 60. The head disk assembly 12 further includes a spindle motor 30 for rotating the magnetic disks 20, 22, 24. The head disk assembly 12 further includes a head stack assembly 32 and a pivot bearing cartridge 34. The head stack assembly 32 includes a rotary actuator 36.

The rotary actuator 36 includes an actuator body 38 that has a bore and the pivot bearing cartridge 34 engaged within the bore for facilitating the rotary actuator 36 to rotate between limited positions. The rotary actuator 36 further includes a coil portion 40 that extends from one side of the actuator body 38 to interact with a pair of permanent magnets 42 to form a voice coil motor for pivoting the rotary actuator 36. A plurality of actuator arms, the lowermost one of which being denoted 44, extend from an opposite side of the actuator body 38. As the disks 20, 22, 24 may be two sided, each of the actuator arms include either one or two head gimbal assemblies associated with the adjacent sides of the disks 20, 22, 24. Each head gimbal assembly includes an air bearing slider or slider (the uppermost one being denoted 46). Each air bearing slider 46 is contemplated to include a transducer head 114 (as shown in phantom in FIGS. 5 and 6) for reading and writing data to and from the disks 20, 22, 24.

The spindle motor 30 includes a spindle motor hub 48 that is rotatably attached to the disk drive base 16. The spindle motor hub 48 has a hub body 49 and a hub flange 50 that extends from the hub body 49. The hub flange 50 includes a supporting surface for supporting a lowermost one of the disks, namely disk 24. The remaining disks 22, 20 are stacked and separated with annular disk spacers 52, 54 that are disposed about the hub body 49. A disk clamp 56 is attached about the spindle motor hub 48 and is utilized to apply a clamping force against the topmost disk 20 for securing all the disks 20, 22, 24 to the spindle motor hub 48.

Figure 2:
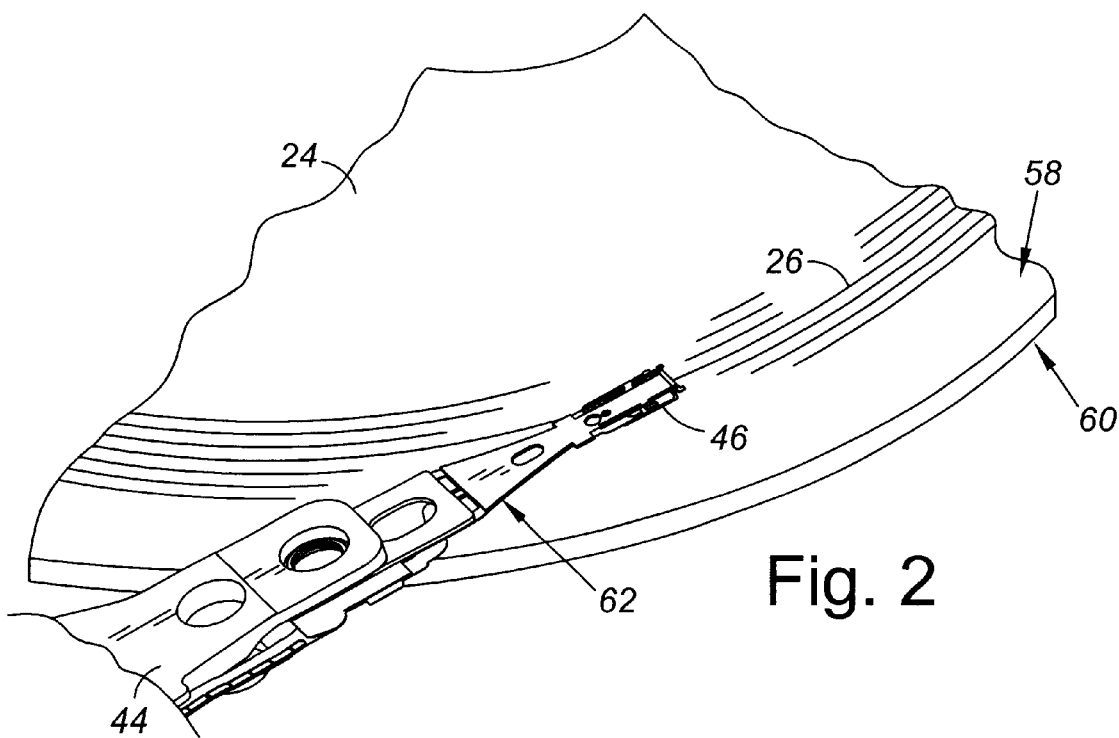
FIG. 2 is an enlarged view of a portion of a magnetic disk shown with a portion of a head gimbal assembly including an air bearing slider as constructed in accordance with the present invention.

Referring now to FIG. 2, there is depicted the distal end of the actuator arm 44 shown with a portion of the disk 24. Each of the head gimbal assemblies includes a suspension 62. The air bearing slider 46 of an embodiment of the present invention is attached to the suspension 62 via a gimbal (not shown). The air bearing slider 46 is configured to fly above the upper facing side 58 of the disk 24 for reading and/or writing data from and to the track 26 of the disk 24. In this regard, during operation of the disk drive 10, in order to maintain the position of the slider 46 adjacent the disk 24, the suspension 62 is configured to exert a force against the attached slider 46 towards the disk 24. Aerodynamic characteristics of the slider 46 result in air pressures which provide the slider 46 with the necessary aerodynamic lift required to fly the slider 46 at a prescribed flying height above the disk 24.

Figure 3:
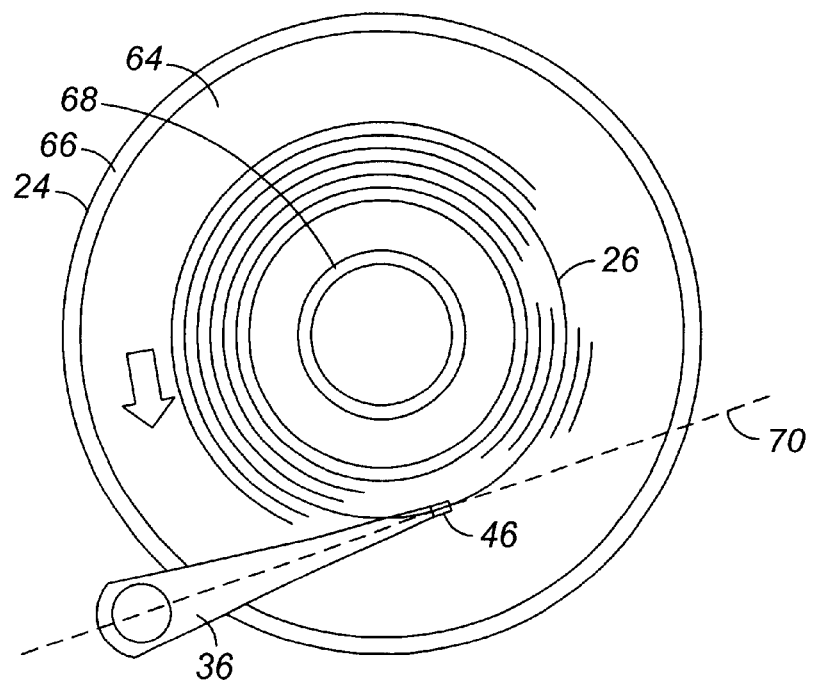
FIG. 3 is a plan view of a magnetic disk and a rotary actuator with an air bearing slider as constructed in accordance with the present invention with the slider over a data region of the disk.
Figure 4:
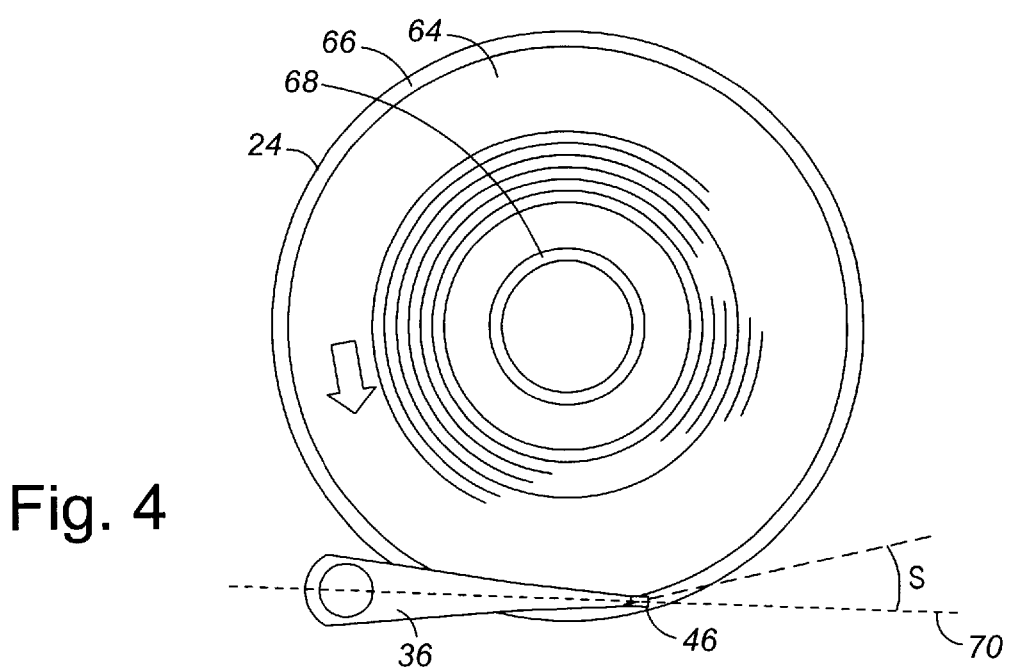
FIG. 4 is a plan view of the magnetic disk and a rotary actuator of FIG. 3, however, with the slider positioned over a non-data region of the disk generally at the outer diameter of the disk.

FIG. 3 is a plan view of the disk 24 and the rotary actuator 36 with the air bearing slider 46. The disk 24 includes a data region 64. In this regard, the track 26 is disposed within the data region 64. The disk 24 is contemplated to further include a non-data region 66 disposed at the outer diameter of the disk 24 and a non-data region 68 disposed at the inner diameter of the disk 24. As shown, the rotary actuator 36 is disposed such that the slider 46 is positioned over the data region 64 and in particular with the slider 46 positioned over the track 26. The rotary actuator 36 defines a longitudinal axis 70. The disposition of the rotary actuator 36 is depicted with the longitudinal axis 70 being generally tangential with the track 24. FIG. 4 is a plan view of the disk 24 and a rotary actuator 36 of FIG. 3, however, with the slider 46 positioned over the non-data region 66 of the disk 24. The disposition of the rotary actuator 36 is depicted with the longitudinal axis 70 being at a skew angle S with respect to a tangent line of the adjacent portion of the disk 24.

Figure 5:
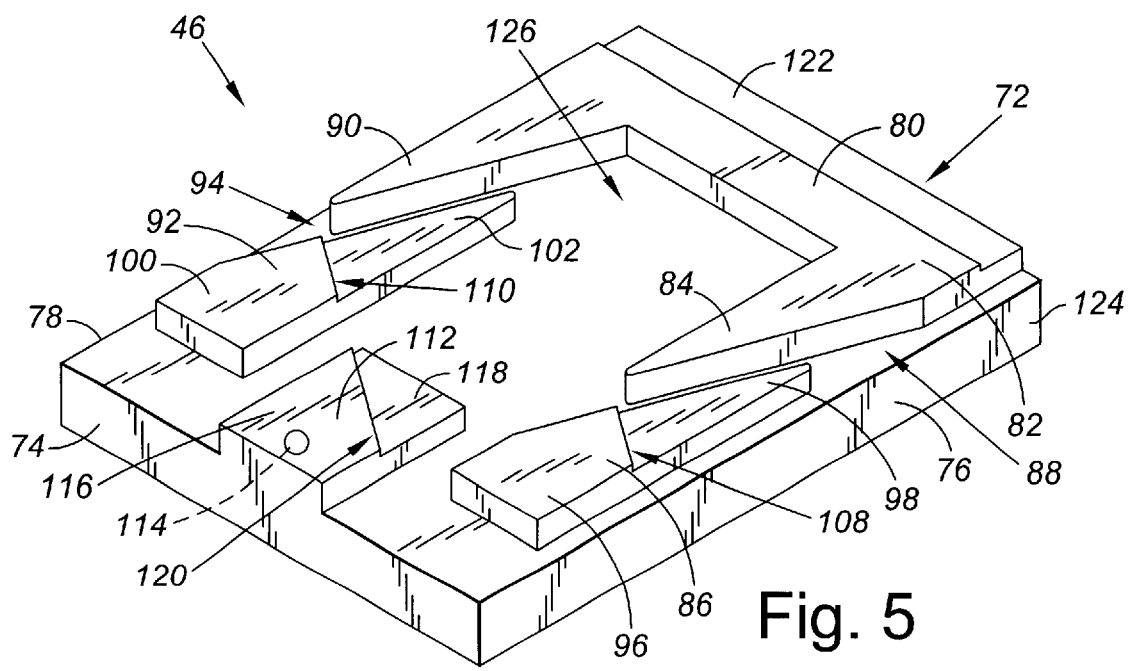
FIG. 5 is a perspective view of the air bearing slider.
Figure 6:
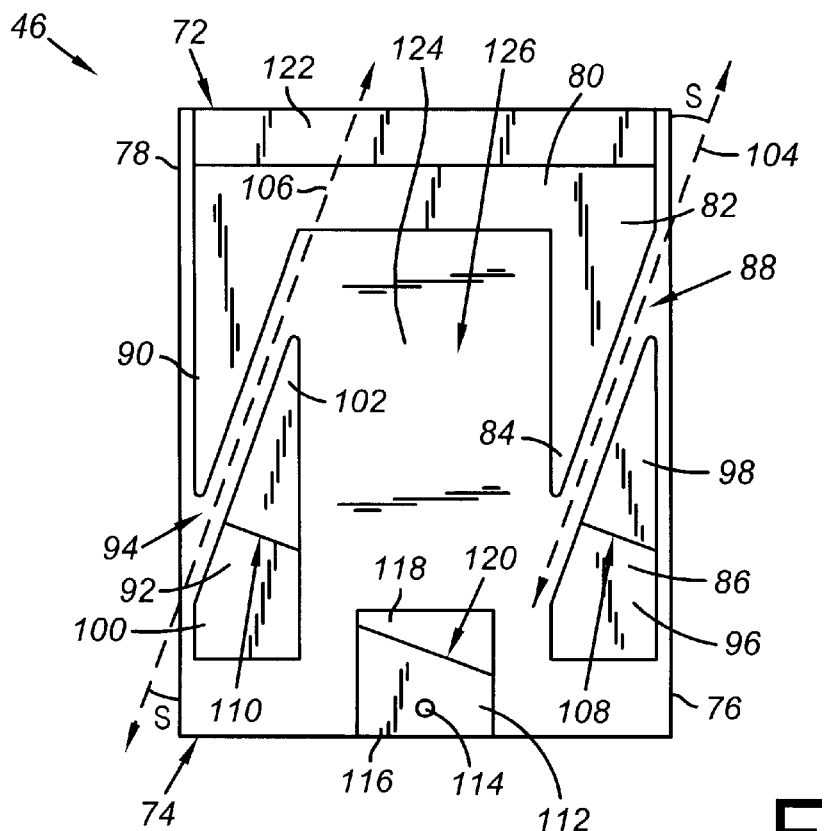
FIG. 6 is a plan view of the air bearing slider.
Figure 7:
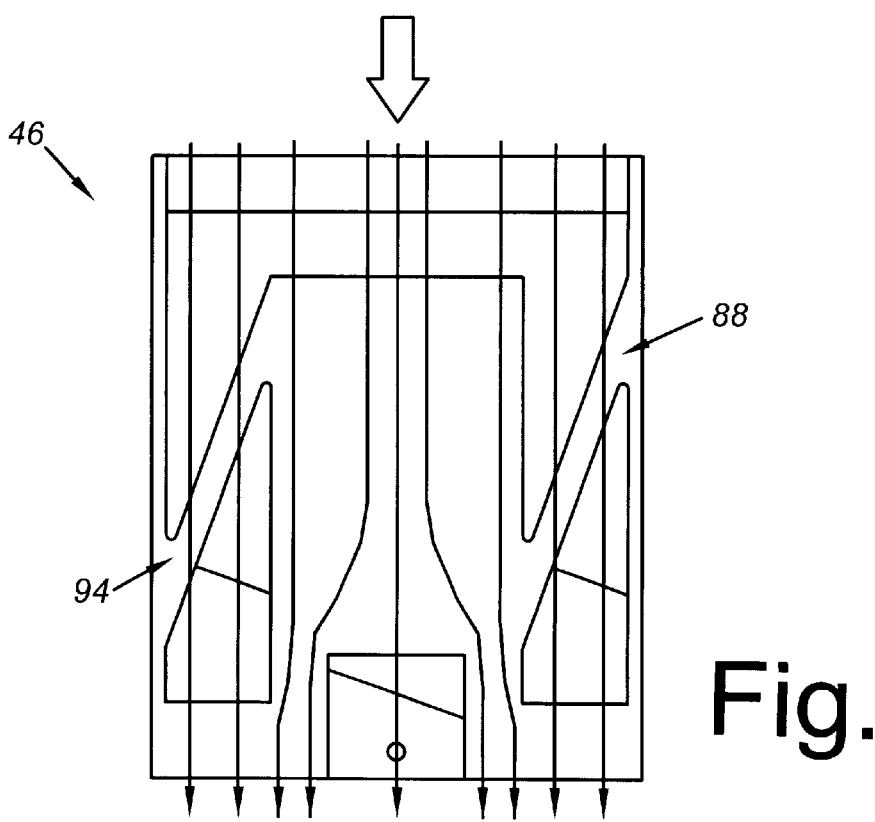
FIG. 7 is the plan view of the air bearing slider of FIG. 6 as shown with exemplary air flow lines with the slider positioned in relation to the disk as shown in FIG. 3.

Referring now to FIGS. 5 and 6, an aspect of the present invention can be regarded as the air bearing slider 46 for use in the disk drive 10. In one preferred embodiment, the disk drive 10 includes a ramp positioned adjacent an OD of the disk 24 for parking the slider 46. In another preferred embodiment, the disk drive 10 includes a ramp positioned adjacent an ID of the disk 24. Alternatively, a landing zone on a disk may be used to park the slider 46. FIG. 5 is a perspective view of the air bearing slider 46 and FIG. 6 is a plan view of the air bearing slider 46. The slider 46 includes a leading side 72 and an opposing trailing side 74. The slider 46 further includes a pair of opposing lateral sides 76,78 disposed between the leading and trailing sides 72,74. The slider 46 further includes a leading side air bearing surface 80. The leading side air bearing surface 80 includes a main portion 82 adjacent the leading side 72 and a first trailing portion 84 extending from the main portion 82 toward the trailing side 74 along the lateral side 76. The slider 46 further includes a first side rail 86 disposed laterally along and between the lateral side 76 and the first trailing portion 84. The slider 46 further includes a first channel 88 formed between the first side rail 86 and the first trailing portion 84 disposed angularly with respect to the lateral side 76 by extending from adjacent the lateral side 76 towards the trailing side 74 away from the lateral side 76 for receiving airflow through the first channel 88 during operation of the disk to drive 10.

As depicted in the embodiment shown, the leading side air bearing surface 80 may further include a second trailing portion 90 extending from the main portion 82 toward the trailing side 74 along the other respective lateral side 78. The slider 46 may further include a second side rail 92 disposed adjacent the lateral side 78. The second trailing portion 90 may be disposed laterally along and between the second side rail 92 and the lateral side 78. The slider 46 may further include a second channel 94 formed between the second trailing portion 90 and the second side rail 92 disposed angularly with respect to the lateral side 78 by extending from adjacent the lateral side 78 towards the leading side 72 away from the lateral side 78 for receiving airflow through the second channel 94 during operation of the disk drive 10.

The first and second trailing portions 84, 90 of this embodiment are tapered toward trailing side 74. The first and second trailing portions 84, 90 may be of other geometries, such as a more rectangular configuration. In addition, while the first and second trailing portions 84, 90 are shown to have a tapered width and are therefore narrow in comparison to the main portion 82, the relative width of the main portion 82 and the first and second trailing portion 84, 90 may be varied. As such, the transition from the main portion 82 to the first and second trailing portions 84, 90 may be more smooth or gradual in nature.

The first and second side rails 86, 92 may be formed to be tapered towards the leading side 72. In addition, the first side rail 86 may include a first side rail air bearing surface 96 disposed toward the trailing side 74. The first side rail 86 may further include a first side rail shallow recessed surface 98 extending away from the first side rail air bearing surface 96 laterally along and between the lateral side 76 and the trailing portion 96. The first side rail shallow recessed surface 98 may be tapered toward the leading side 72. Further, the second side rail 92 may include a second side rail air bearing surface 100 disposed toward the trailing side 74. The second side rail 92 may further include a second side rail shallow recessed surface 102 extending away from the second side rail air bearing surface 100 laterally along and between the lateral side 78 and the trailing portion 96. The second side rail shallow recessed surface 102 may be tapered toward the leading side 72. The first and second side rail shallow recessed surface 98, 102 may be of other geometries, such as a more rectangular configuration. In addition, the first and second side rail air bearing surfaces 96, 100 are shown to form a step with respect to the first and second side rail shallow recessed surfaces 98, 102. However, such abrupt transition is not required and may be of a more or less pronounced transition. Moreover, the relative sizing of the first and second side rail shallow recessed surface 98, 102 with respect to the first and second trailing portions 84, 90 may be of other relative sizing than shown.

Figure 8:
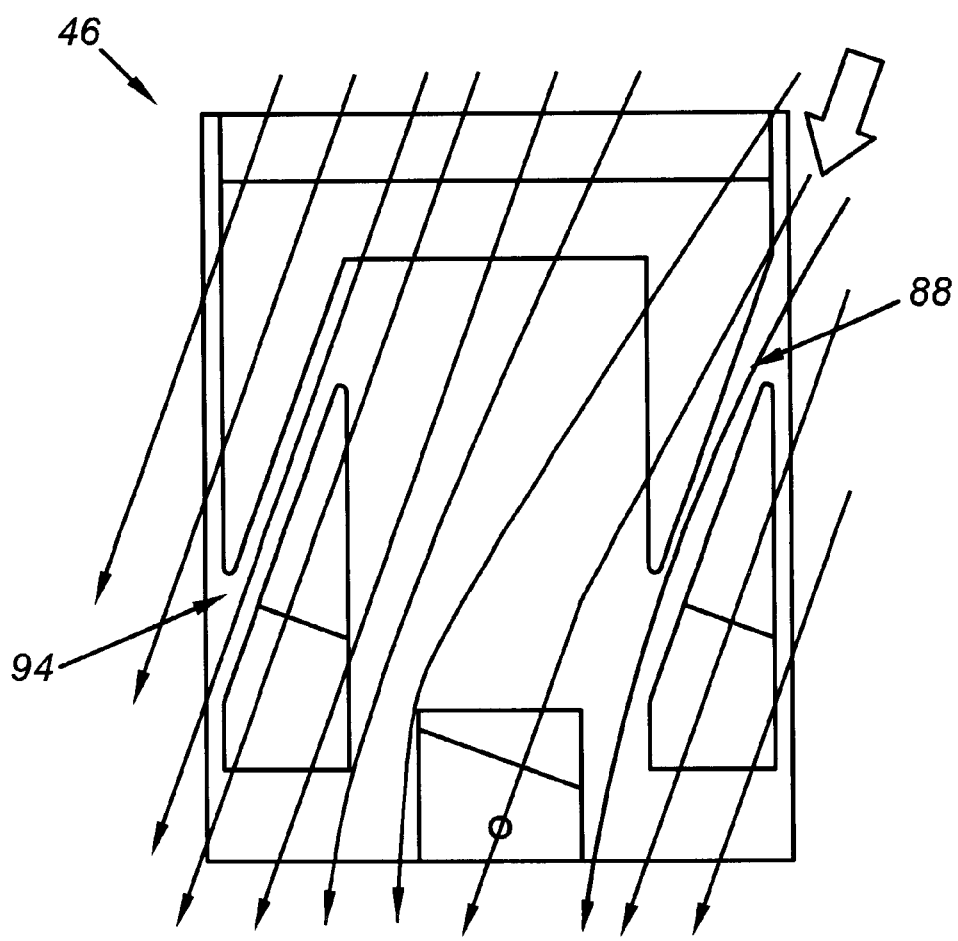
FIG. 8 is the plan view of the air bearing slider of FIG. 6 as shown with exemplary air flow lines with the slider positioned in relation to the disk as shown in FIG. 4.

The first and second channels 88, 94 may be disposed at an angle of between 10 to 20 degrees with respect to the respective lateral sides 76, 78. The first and second channels 88, 94 each define a channel axis 104, 106. The angular orientations of the channel axes 104, 106 may be defined such that the first and second channels 88, 94 are relatively aligned with airflow with the slider 46 positioned in a given loading or unloading position. In this regard, referring additionally to FIG. 7 there is depicted the plan view of the air bearing slider 46 of FIG. 6 as shown with exemplary air flow lines with the slider 46 positioned in relation to the disk 24 as shown in FIG. 3. Referring additionally to FIG. 8, there is depicted the plan view of the air bearing slider of FIG. 6 as shown with exemplary air flow lines with the slider 46 positioned in relation to the disk 24 as shown in FIG. 4. As such, it is contemplated that with the slider 46 subjected to an air flow condition such as depicted in FIGS. 4 and 8, the channel axes 104, 106 may be designed to be angularly disposed at an angle similar to the skew angle S as shown. It is contemplated that such angular orientation results in increased air flow through the first and second channels 88, 94 with the slider 46 disposed adjacent the non-data region 66 in comparison to the data region 64. Such increased air flow is contemplated to result in increased aerodynamic lift resulting is a relatively higher fly-height profile over such non-data region 66. In this regard, the slider 46 may be designed to have a fly-height of on the order of 0.4 micro-inches over the data region 64 and an additional 0.05–0.2 micro-inches over the non-data region 66.

Additionally, while the first and second channels 88, 94 are shown to have a relatively constant width, other configurations are contemplated such as with the first and second channels 88, 94 being tapered.

The first and second side rail air bearing surfaces 96, 100 may respectively include first and second leading edges 108, 110 angularly disposed with respect to the opposing lateral sides 76, 78. The first and second leading edges 108, 110 of the first and second side rail air bearing surfaces 96, 100 are disposed substantially perpendicular with respect to the respective first and second channels 88, 94. As used herein substantially perpendicular refers to the ninety degrees plus or minus twenty degrees.

The slider 46 may further include a trailing side pad 112 including a transducer 114 (shown in phantom) disposed adjacent the trailing side 74. The trailing side pad 112 may include a trailing side air bearing surface 116 disposed adjacent the trailing side 74. The trailing side pad 112 may include a trailing side shallow recessed surface 118 extending towards the leading side 72 from the trailing side air bearing surface 116. In practice, the trailing side air bearing surface 116 may extend above the trailing side shallow recessed surface 118 by about 0.1 to 0.3 microns, and the trailing side shallow recessed surfaces 118 may extend from the main support structure 124 by about 1 to 3 microns. As shown, however, for ease of discussion and depiction, it is understood that the relative heights of the trailing side air bearing surface 116 and the trailing side shallow recessed surface 118 are exaggerated in relation to the main support structure 124. In addition, in other embodiments, it is contemplated that the trailing side pad 112 may be integrally formed with either of the first or second side rails 86, 92.

The trailing side air bearing surface 116 may include a leading edge 120 angularly disposed with respect to the opposing lateral sides 76, 78. The leading edge 120 of the trailing side air bearing surface 116 may be disposed substantially perpendicular with respect to the first and second channels 88, 94, and in particular the first channel 88. As used herein substantially perpendicular refers to the ninety degrees plus or minus twenty degrees.

The leading side air bearing surface 80 may further include a leading side shallow recessed surface 122 disposed adjacent the leading side 72. In addition, the slider 46 is contemplated to be generally defined by a main support structure 124. The slider 46 may further include a deep recessed surface 126 disposed between the leading and trailing sides 72, 74. In this regard, the deep recessed surface 126 may be disposed upon the main support structure 124. The deep recessed surface 126 may extend into the first and second channels 88, 94. In practice, the leading side air bearing surface 80 may extend above the leading side shallow recessed surface 122 by about 0.1 to 0.3 microns, and the leading side shallow recessed surface 122 may extend from the main support structure 124 by about 1 to 3 microns. As shown, however, for ease of discussion and depiction, it is understood that the relative heights of the leading side air bearing surface 80 and the leading side shallow recessed surface 122 are exaggerated in relation to the main support structure 124. The main portion 82 of the leading side air bearing surface 80 of this embodiment forms a step with respect to the leading side shallow recessed surface 122. However, such abrupt transition is not required and may be of a more or less pronounced transition.

With respect to the first and second side rails 86, 92, in practice, the first and second side rail air bearing surfaces 96, 100 may extend above the first and second side rail shallow recessed surfaces 98, 102 by about 0.1 to 0.3 microns, and the first and second side rail shallow recessed surfaces 98, 102 may extend from the main support structure 124 by about 1 to 3 microns. As shown, however, for ease of discussion and depiction, it is understood that the relative heights of the first and second side rail air bearing surfaces 96, 100 and the first and second side rail shallow recessed surfaces 98, 102 are exaggerated in relation to the main support structure 124.

We claim:

1. An air bearing slider for use in a disk drive, the slider comprising:

a leading side and an opposing trailing side;

a pair of opposing lateral sides disposed between the leading and trailing sides;

a leading side air bearing surface including a main portion adjacent the leading side, and a trailing portion extending from the main portion toward the trailing side along a respective one of the lateral sides;

a side rail disposed laterally along and between the respective lateral side and the trailing portion, the side rail including a side rail air bearing surface disposed toward the trailing side, the side rail including a side rail shallow recessed surface extending away from the side rail air bearing surface laterally along and between the respective lateral side and the trailing portion; and a channel formed between the side rail and the trailing portion disposed angularly with respect to the respective lateral side by extending from adjacent the respective lateral side towards the trailing side away from the respective lateral side for receiving airflow through the channel during operation of the disk drive.

2. The slider of claim 1 wherein the side rail is tapered towards the leading side.

3. The slider of claim 1 wherein the trailing portion is tapered towards trailing side.

4. The slider of claim 1 wherein the side rail shallow recessed surface is tapered toward the leading side.

5. The slider of claim 1 wherein the side rail air bearing surface includes a leading edge angularly disposed with respect to the opposing lateral sides.

6. The slider of claim 5 wherein the leading edge of the side rail air bearing surface is disposed substantially perpendicular with respect to the channel.

7. The slider of claim 1 further includes a deep recessed surface disposed between the leading and trailing sides.

8. The slider of claim 7 wherein the deep recessed surface extends into the channel.

9. The slider of claim 1 wherein the channel is disposed at an angle of between 10 to 20 degrees with respect to the respective lateral side.

10. The slider of claim 1 further includes a trailing side pad including a transducer disposed adjacent the trailing side.

11. The slider of claim 10 wherein the trailing side pad includes a trailing side air bearing surface disposed adjacent the trailing side.

12. The slider of claim 11 wherein the trailing side pad includes a trailing side shallow recessed surface extending towards the leading side from the trailing side air bearing surface.

13. The slider of claim 12 wherein the trailing side air bearing surface includes a leading edge angularly disposed with respect to the opposing lateral sides.

14. The slider of claim 13 wherein the leading edge of the trailing side air bearing surface is disposed substantially perpendicular with respect to the channel.

15. The slider of claim 1 wherein the side rail is a first side rail, the slider further includes a second side rail disposed adjacent the other respective one of the opposing lateral sides.

16. The slider of claim 15 wherein the trailing portion is a first trailing portion, the leading side air bearing surface further includes a second trailing portion extending from the main portion toward the trailing side along the other respective lateral side.

17. The slider of claim 15 wherein the second trailing portion is disposed laterally along and between the second side rail and the other respective lateral side.

18. The slider of claim 17 wherein the channel is a first channel, the slider further includes a second channel formed between the second trailing portion and the second side rail disposed angularly with respect to the other respective lateral side by extending from adjacent the other respective lateral side towards the leading side away from the other respective lateral side for receiving airflow through the second channel during operation of the disk drive.

19. A disk drive comprising:
a disk drive housing; and
a head stack assembly rotatably coupled to the disk drive housing, the head stack assembly including an air bearing slider, the slider including:
a leading side and an opposing trailing side;
a pair of opposing lateral sides disposed between the leading and trailing sides;
a leading side air bearing surface including a main portion adjacent the leading side, and a trailing portion extending from the main portion toward the trailing side along a respective one of the lateral sides;
a side rail disposed laterally along and between the respective lateral side and the trailing portion, the side rail including a side rail air bearing surface disposed toward the trailing side, the side rail including a side rail shallow recessed surface extending away from the side rail air bearing surface laterally along and between the respective lateral side and the trailing portion; and
a channel formed between the side rail and the trailing portion disposed angularly with respect to the respective lateral side by extending from adjacent the respective lateral side towards the trailing side away from the respective lateral side for receiving airflow through the channel during operation of the disk drive.

20. The disk drive of claim 19 wherein the side rail is tapered towards the leading side.

21. The disk drive of claim 19 wherein the trailing portion is tapered towards trailing side.

22. The disk drive of claim 19 wherein the side rail shallow recessed surface is tapered toward the leading side.

23. The disk drive of claim 19 wherein the side rail air bearing surface includes a leading edge angularly disposed with respect to the opposing lateral sides.

24. The disk drive of claim 23 wherein the leading edge of the side rail air bearing surface is disposed substantially perpendicular with respect to the channel.

25. The disk drive of claim 19 wherein the channel is disposed at an angle of between 10 to 20 degrees with respect to the respective lateral side.

26. The disk drive of claim 19 wherein the side rail is a first side rail, the slider further includes a second side rail disposed adjacent the other respective one of the opposing lateral sides.

27. The disk drive of claim 26 wherein the trailing portion is a first trailing portion, the leading side air bearing surface further includes a second trailing portion extending from the main portion toward the trailing side along the other respective lateral side.

28. The disk drive of claim 26 wherein the second trailing portion is disposed laterally along and between the second side rail and the other respective lateral side.

29. The disk drive of claim 28 wherein the channel is a first channel, the slider further includes a second channel formed between the second trailing portion and the second side rail disposed angularly with respect to the other respective lateral side by extending from adjacent the other respective lateral side towards the leading side away from the other respective lateral side for receiving airflow through the second channel during operation of the disk drive.

30. An air bearing slider for use in a disk drive, the slider comprising:
a leading side and an opposing trailing side;
a pair of opposing lateral sides disposed between the leading and trailing sides;
a leading side air bearing surface including a main portion adjacent the leading side, and a trailing portion extending from the main portion toward the trailing side along a respective one of the lateral sides;
a side rail disposed laterally along and between the respective lateral side and the trailing portion;
a channel formed between the side rail and the trailing portion disposed angularly with respect to the respective lateral side by extending from adjacent the respective lateral side towards the trailing side away from the respective lateral side for receiving airflow through the channel during operation of the disk drive; and
a trailing side pad including a transducer disposed adjacent the trailing side and a trailing side air bearing surface disposed adjacent the trailing side, the trailing side air bearing surface including a leading edge angularly disposed with respect to the opposing lateral sides.

31. The slider of claim 30 wherein the trailing side pad includes a trailing side shallow recessed surface extending towards the leading side from the trailing side air bearing surface.

32. The slider of claim 30 wherein the leading edge of the trailing side air bearing surface is disposed substantially perpendicular with respect to the channel.

33. The slider of claim 30 further includes a deep recessed surface disposed between the leading and trailing sides.

34. The slider of claim 30 wherein the deep recessed surface extends into the channel.

35. The slider of claim 30 wherein the side rail is a first side rail, the slider further includes a second side rail disposed adjacent the other respective one of the opposing lateral sides.

36. The slider of claim 35 wherein the trailing portion is a first trailing portion, the leading side air bearing surface further includes a second trailing portion extending from the main portion toward the trailing side along the other respective lateral side.

37. The slider of claim 35 wherein the second trailing portion is disposed laterally along and between the second side rail and the other respective lateral side.

38. The slider of claim 37 wherein the channel is a first channel, the slider further includes a second channel formed between the second trailing portion and the second side rail disposed angularly with respect to the other respective lateral side by extending from adjacent the other respective lateral side towards the leading side away from the other respective lateral side for receiving airflow through the second channel during operation of the disk drive.

39. A disk drive comprising:
a disk drive housing; and
a head stack assembly rotatably coupled to the disk drive housing, the head stack assembly including an air bearing slider, the slider including:
a leading side and an opposing trailing side;
a pair of opposing lateral sides disposed between the leading and trailing sides;
a leading side air bearing surface including a main portion adjacent the leading side, and a trailing portion extending from the main portion toward the trailing side along a respective one of the lateral sides;

a side rail disposed laterally along and between the respective lateral side and the trailing portion;

a channel formed between the side rail and the trailing portion disposed angularly with respect to the respective lateral side by extending from adjacent the respective lateral side towards the trailing side away from the respective lateral side for receiving airflow through the channel during operation of the disk drive; and a trailing side pad including a transducer disposed adjacent the trailing side and a trailing side air bearing surface disposed adjacent the trailing side, the trailing side air bearing surface including a leading edge angularly disposed with respect to the opposing lateral sides.

40. The disk drive of claim 30 wherein the trailing side pad includes a trailing side shallow recessed surface extending towards the leading side from the trailing side air bearing surface.

41. The disk drive of claim 40 wherein the leading edge of the trailing side air bearing surface is disposed substantially perpendicular with respect to the channel.

42. The disk drive of claim 40 wherein the slider further includes a deep recessed surface disposed between the leading and trailing sides.

43. The disk drive of claim 40 wherein the deep recessed surface extends into the channel.

44. The disk drive of claim 40 wherein the side rail is a first side rail, the slider further includes a second side rail disposed adjacent the other respective one of the opposing lateral sides.

45. The disk drive of claim 44 wherein the trailing portion is a first trailing portion, the leading side air bearing surface further includes a second trailing portion extending from the main portion toward the trailing side along the other respective lateral side.

46. The disk drive of claim 44 wherein the second trailing portion is disposed laterally along and between the second side rail and the other respective lateral side.

47. The disk drive of claim 46 wherein the channel is a first channel, the slider further includes a second channel formed between the second trailing portion and the second side rail disposed angularly with respect to the other respective lateral side by extending from adjacent the other respective lateral side towards the leading side away from the other respective lateral side for receiving airflow through the second channel during operation of the disk drive.

48. An air bearing slider for use in a disk drive, the slider comprising:

a leading side and an opposing trailing side;

a pair of opposing lateral sides disposed between the leading and trailing sides;

a leading side air bearing surface including a main portion adjacent the leading side, and a trailing portion extending from the main portion toward the trailing side along a respective one of the lateral sides;

a first side rail disposed laterally along and between the respective lateral side and the trailing portion;

a second side rail disposed adjacent the other respective one of the opposing lateral sides, wherein the trailing portion is a first trailing portion, the leading side air bearing surface further includes a second trailing portion extending from the main portion toward the trailing side along the other respective lateral side, wherein the second trailing portion being disposed laterally along and between the second side rail and the other respective lateral side; and a channel formed between the side rail and the trailing portion disposed angularly with respect to the respective lateral side by extending from adjacent the respective lateral side towards the trailing side away from the respective lateral side for receiving airflow through the channel during operation of the disk drive.

49. The slider of claim 48 further includes a deep recessed surface disposed between the leading and trailing sides.

50. The slider of claim 48 wherein the deep recessed surface extends into the channel.

51. The slider of claim 48 wherein the trailing portion is a first trailing portion, the leading side air bearing surface further includes a second trailing portion extending from the main portion toward the trailing side along the other respective lateral side.

52. The slider of claim 48 wherein the channel is a first channel, the slider further includes a second channel formed between the second trailing portion and the second side rail disposed angularly with respect to the other respective lateral side by extending from adjacent the other respective lateral side towards the leading side away from the other respective lateral side for receiving airflow through the second channel during operation of the disk drive.

53. A disk drive comprising:

a disk drive housing; and a head stack assembly rotatably coupled to the disk drive housing, the head stack assembly including an air bearing slider, the slider including:

a leading side and an opposing trailing side;

a pair of opposing lateral sides disposed between the leading and trailing sides;

a leading side air bearing surface including a main portion adjacent the leading side, and a trailing portion extending from the main portion toward the trailing side along a respective one of the lateral sides;

a first side rail disposed laterally along and between the respective lateral side and the trailing portion;

a second side rail disposed adjacent the other respective one of the opposing lateral sides, wherein the trailing portion is a first trailing portion, the leading side air bearing surface further includes a second trailing portion extending from the main portion toward the trailing side along the other respective lateral side, wherein the second trailing portion being disposed laterally along and between the second side rail and the other respective lateral side; and a channel formed between the first rail and the trailing portion disposed angularly with respect to the respective lateral side by extending from adjacent the respective lateral side towards the trailing side away from the respective lateral side for receiving airflow through the channel during operation of the disk drive.

54. The disk drive of claim 53 wherein the slider further includes a deep recessed surface disposed between the leading and trailing sides.

55. The disk drive of claim 53 wherein the deep recessed surface extends into the channel.

56. The disk drive of claim 53 wherein the trailing portion is a first trailing portion, the leading side air bearing surface further includes a second trailing portion extending from the main portion toward the trailing side along the other respective lateral side.

57. The disk drive of claim 53 wherein the channel is a first channel, the slider further includes a second channel formed between the second trailing portion and the second side rail disposed angularly with respect to the other respective lateral side by extending from adjacent the other respective lateral side towards the leading side away from the other respective lateral side for receiving airflow through the second channel during operation of the disk drive.

* * * * *